US008444359B2

(12) United States Patent
Grether et al.

(10) Patent No.: US 8,444,359 B2
(45) Date of Patent: May 21, 2013

(54) SEAT TRACK AND MONUMENT ATTACH FASTENER

(75) Inventors: Martin R. Grether, Mill Creek, WA (US); Miki Beatovic, Everett, WA (US)

(73) Assignee: The Boeing Company, Chicago, IL (US)

( * ) Notice: Subject to any disclaimer, the term of this patent is extended or adjusted under 35 U.S.C. 154(b) by 368 days.

(21) Appl. No.: 12/897,060

(22) Filed: Oct. 4, 2010

(65) Prior Publication Data
US 2012/0082527 A1    Apr. 5, 2012

(51) Int. Cl.
*F16B 35/02*  (2006.01)

(52) U.S. Cl.
USPC ......................................... 411/385; 29/525.02

(58) Field of Classification Search
USPC .............. 411/354–359, 33, 35, 77, 216–218, 411/383, 385, 419; 29/525.02, 525.05, 525.11, 29/525.13
See application file for complete search history.

(56) References Cited

U.S. PATENT DOCUMENTS

| | | | |
|---|---|---|---|
| 2,892,376 A * | 6/1959 | Schonfeld | 411/63 |
| 3,922,946 A * | 12/1975 | Grayson | 411/385 |
| 4,478,546 A * | 10/1984 | Mercer | 411/385 |
| 4,975,014 A * | 12/1990 | Rufin et al. | 411/385 |
| 5,090,857 A * | 2/1992 | Dunn | 411/385 |
| 5,634,754 A * | 6/1997 | Weddendorf | 411/354 |
| 5,788,443 A * | 8/1998 | Cabahug | 411/385 |
| 6,474,920 B2 * | 11/2002 | Lin | 411/385 |
| 7,988,395 B2 * | 8/2011 | Steffier | 411/385 |
| 8,342,787 B2 * | 1/2013 | Smith | 411/383 |
| 2009/0169337 A1 | 7/2009 | LaConte et al. | |

OTHER PUBLICATIONS

Avibank Mfg. Inc, 11500 N. Sherman Way, North Hollywood, CA 91605, E-Nut® Fastening System New Product Bulletin, Jan. 23, 2009.
Goodrich Interiors, 1275 North Newport Road, Colorado Springs, Colorado 80916-2779, Installation Instructions and Limitations for Model 2787 Track-Mounted Cabin Attendant Seat for Boeing 787 Aircraft, Dec. 9, 2008, pp. 1-8.

* cited by examiner

*Primary Examiner* — Gary Estremsky
(74) *Attorney, Agent, or Firm* — Felix L. Fischer (57) ABSTRACT

A blind fastener employs a split bolt element having two symmetrical half sections split at mating separation faces and cooperatively displaceable between a first collapsed position and a second expanded position. A capture portion split bolt has a substantially circular plan form in the first collapsed position with a diameter which is received through an attachment hole in a structural member. A bearing section and a threaded portion both have a substantially circular plan form in the second expanded position while the capture portion has compression surfaces extending with an elliptical major axis greater than the hole diameter in the extended second position to engage a bottom surface surrounding the attachment hole. The bearing section closely engages the attachment hole in the expanded position. A wedge separator element is insertable between the half sections to expand them from the first collapsed position to the second expanded position. A nut is threadably received on the threaded portion and engages a lip on a mounting aperture in a monument to be attached to the supporting structure.

16 Claims, 14 Drawing Sheets

SEAT TRACK AND MONUMENT ATTACH FASTENER

BACKGROUND INFORMATION

1. Field

Embodiments of the disclosure relate generally to structural attachment fittings and more particularly to embodiments for a blind fastening system employing a self-restraining split bolt and separator wedge with a captured nut.

2. Background

Attachment of seat tracks, intercostals, floor panels and other elements and fittings to supporting structure in vehicles such as aircraft often requires the use of blind fasteners. To be effective for ease of installation, structurally sound and failure resistant blind fasteners must have robust structural capability but remain compact and simple to install.

It is therefore desirable to provide a blind fastener system which is hole filling for shear strength and provides high tension strength for attaching aircraft or other vehicle cabin components. It is further desirable that the blind fastener system be low profile, fit into envelope restrictions often present in close cabin spaces and be inspectable for proper installation.

SUMMARY

Embodiments disclosed herein provide a blind fastener with a split bolt element having two symmetrical half sections split at mating separation faces and cooperatively displaceable between a first collapsed position and a second expanded position. The half sections incorporate a nose portion with a circumferential groove receiving a snap ring to secure the half sections together. A capture portion adjacent the nose portion has a substantially circular plan form in the fist collapsed position with a diameter which is received through an attachment hole in a structural member. A bearing section and a threaded portion both have a substantially circular plan form in the second expanded position while the capture portion has compression surfaces extending with an elliptical major axis greater than the hole diameter in the extended second position to engage a bottom surface surrounding the attachment hole. The bearing section closely engages the attachment hole in the expanded position. A wedge separator element is insertable between the half sections to expand them from the first collapsed position to the second expanded position. A nut is threadably received on the threaded portion and engages a lip on a mounting aperture in a monument to be attached to the supporting structure. The mounting aperture is concentric with said attachment hole.

In one exemplary implementation, a track attach fastener system, a bolt assembly is split into two halves along its longitudinal centerline. The bolt assembly has a barrel shaped bolt having a first and a second end with a threaded segment along a section of the first end and a shoulder section along a segment of the second end. A plurality of anti-rotation lugs are located between said first and second ends. A circumferential groove located along said second end receives a snap ring configured to fit into the groove to secure the two bolt assembly halves. A wedge separator element extends along at least the full length of the bolt assembly and is configured to fit between the two bolt assembly halves. A threaded nut is configured to engage the threaded segment of the barrel shaped bolt. The track attach fastener fits into a track to secure seats or monuments to a floor system.

A method for blind fastening may be accomplished by placing a monument to be attached on a receiving structural member with attachment holes aligned with corresponding mounting apertures. A split bolt element, with opposing half sections, is compressed to a configuration with a capture portion in a substantial circular plan form and inserted by guiding the capture portion through a mounting aperture and attachment hole. A bearing section is placed adjacent the walls of the attachment hole. A wedge separator element with a nut engaged is inserted between separating faces of the opposing half sections, urging the half sections into a configuration having a substantially circular plan form in the bearing section and threaded upper portion and an extended elliptical plan form of the capture portion extending compression surfaces of the capture portion under a bottom surface of the structural element adjacent the attachment hole. This simultaneously places the bearing section in closely received engagement with the attachment hole and the threaded upper portions in position to threadably receive the nut. The nut is threaded onto the threaded upper portions of the split bolt element and engages ears extending from the wedge separator element with a flange of the nut driving the wedge separator element through the half sections creating firm engagement between the bearing section and attachment hole. The nut is tightened to bring the flange on the lower surface of the nut into contact with a lip of the mounting aperture drawing the compression surfaces on the capture portion into firm engagement with the structural member bottom surface tensioning the split bolt element and securely fastening the monument to the structural member.

The features, functions, and advantages that have been discussed can be achieved independently in various embodiments of the present disclosure or may be combined in yet other embodiments further details of which can be seen with reference to the following description and drawings.

DETAILED DESCRIPTION

Figure 1:
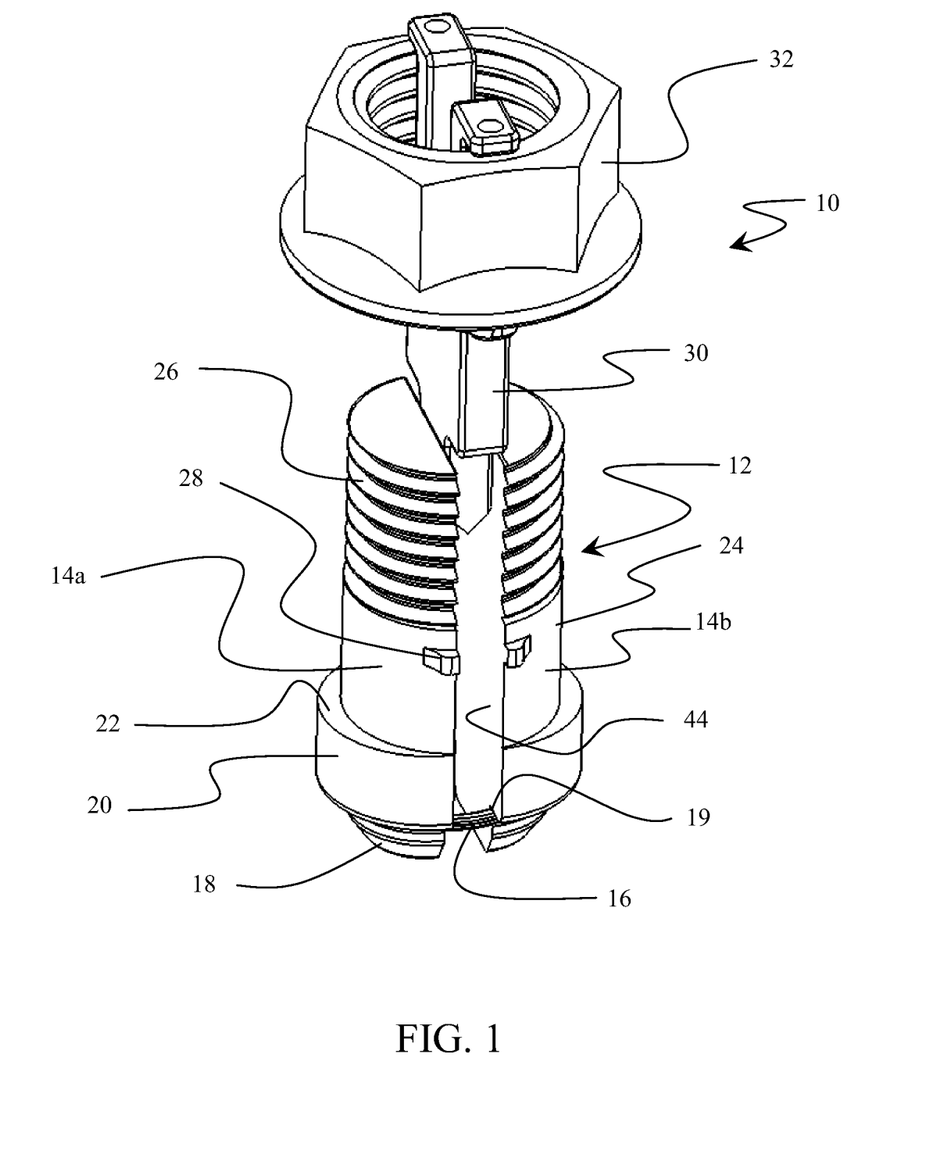
FIG. 1 is an isometric view of the elements of an exemplary embodiment.

The embodiments described herein demonstrate a blind fastener system that is hole filling for shear strength, and provides high tension strength for attaching components directly or monuments for indirect component attachment to structural supports. The embodiments demonstrate a low profile, compact design to fit into envelope restrictions demanded by modern aircraft cabin systems which is easy to inspect for proper installation. The fastener can be used for all types of attachments, including, without limitation, seat tracks, intercostals, floor panels and monuments for other cabin element attachment. Referring to the drawings, FIG. 1 shows an exemplary embodiment of the blind fastener system 10 such as a track attach fastener for aircraft use. A split bolt element 12, which is substantially barrel shaped in an expanded position, includes symmetrical half sections 14a, 14b joined by a spiral snap ring 16. At a first end of the split bolt element, each half section incorporates a tapered nose insertion portion 18 having a circumferential groove 19 to receive and retain snap ring 16. In alternative embodiments, a pin extending between the half sections or alternative retainer to avoid complete separation of the half sections may be employed. A shouldered capture portion 20 adjacent the nose insertion portion at the first end provides a compression surface 22, the function of which will be described in greater detail subsequently. An unthreaded bearing section 24 extends upward from the capture portion and terminates in a threaded top portion 26 at a second end of the split bolt element. Diametrically opposing lugs 28 located between the first and second ends of the split bolt element provide installation stop and anti-rotation capabilities to be described subsequently. A wedge separator element 30 is received between half sections 14a and 14b and a nut 32 is captively retained by the wedge separator element. For exemplary implementations, the split bolt element is A 286 Steel providing high strength capability of approximately 15 kips (15,000 psi). In alternative embodiments, other a materials which provide the desired tension strength with respect to required sizing may be employed.

Figure 2:
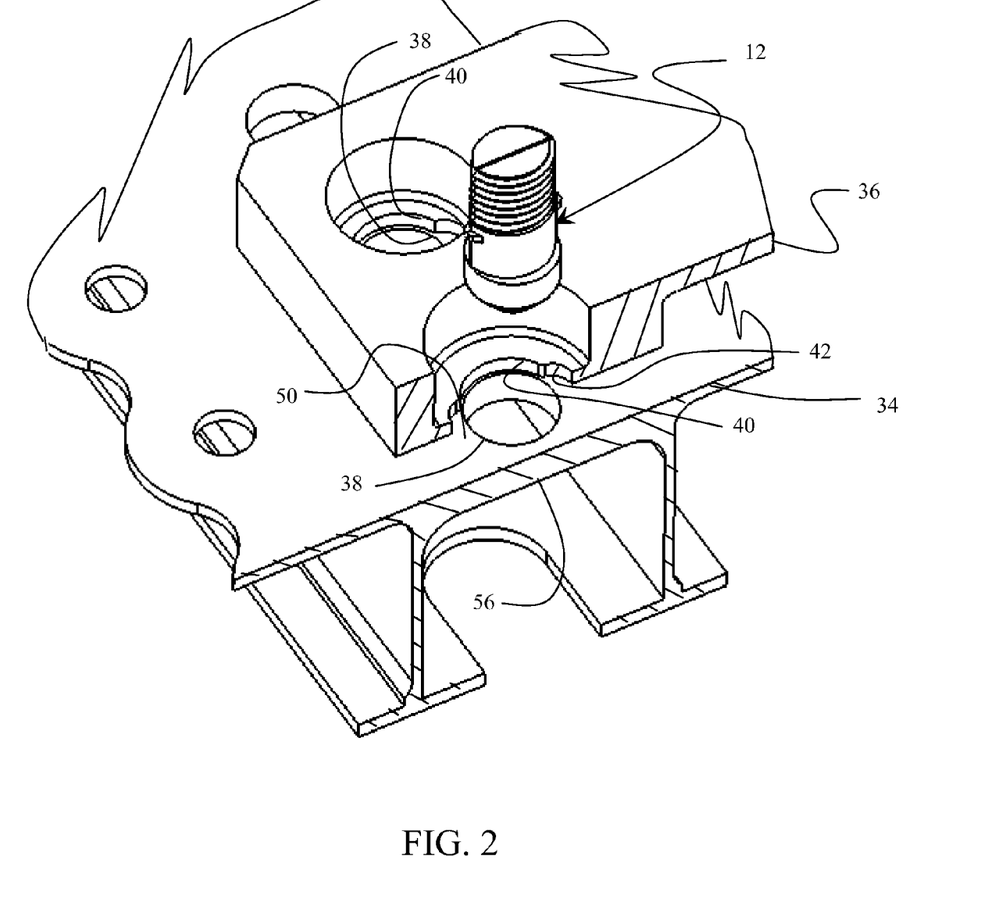
FIG. 2 is an isometric view of a structure element with an exemplary component monument for attachment.

FIG. 2 shows a structural member 34 on which a support monument 36 is to be attached. In an exemplary use in an aircraft, the structural member may be a seat track and the monument an attachment fitting for a seat or the structural member may be a cabin floor structural member and the monument the seat track itself being mounted to the floor. Attachment holes 38 are provided in the structural member 34 in matching spaced relation to mounting apertures 40 in the support monument 36. Diametrically opposing reliefs 42 are formed in mounting apertures 40 for engagement of anti-rotation features of the blind fastener system as will be described in greater detail subsequently.

Figure 3A:
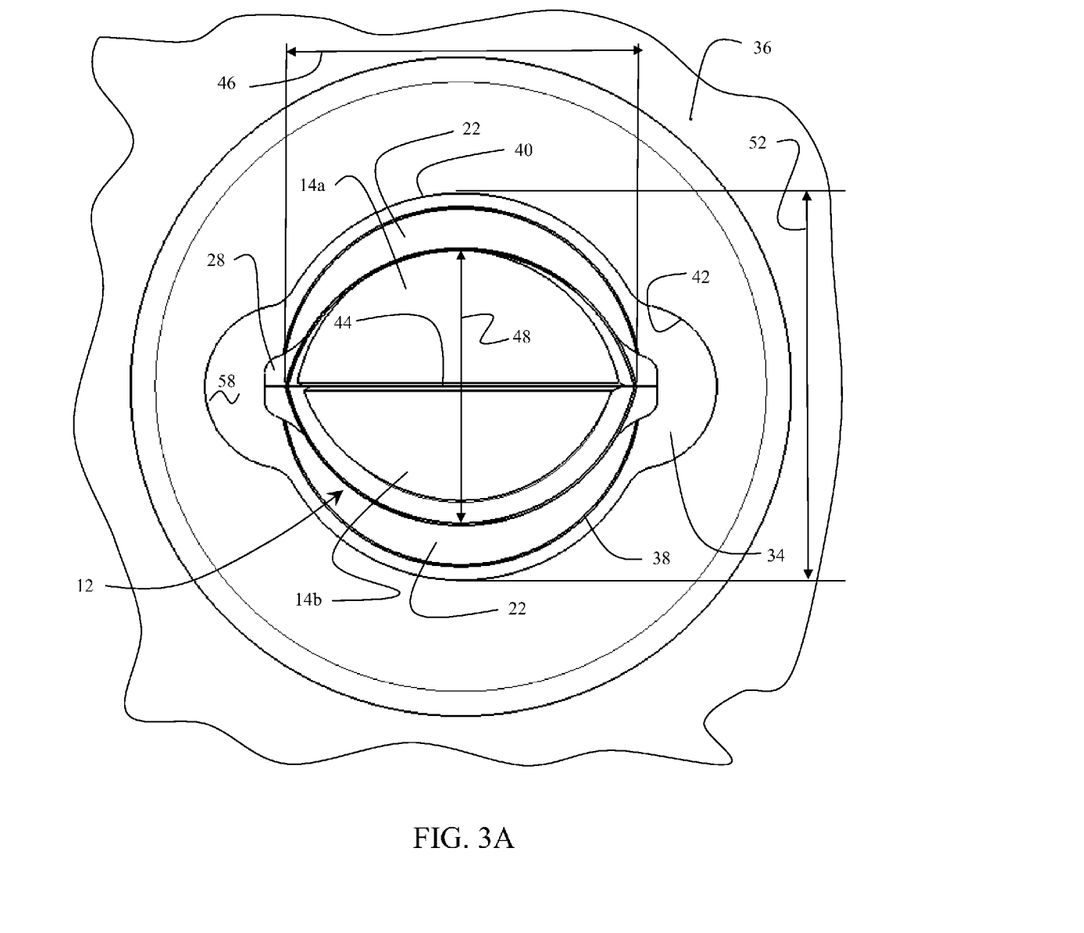
FIG. 3A is a top view of the split bolt element compressed for hole insertion.

As shown in FIG. 3A, without the wedge separator element inserted, half sections 14a and 14b of split bolt element 12 may be compressed against mating separation faces 44 along a longitudinal center line of the split bolt element. In this compressed configuration, capture portions 20 of the split bolt elements mate to provide a substantially circular plan form having a diameter 46 received through mounting apertures 40 and attachment holes 38. Bearing section 24 and top threaded portion 26 (both best seen in FIG. 1) of the split bolt element are clipped semi sections of a cylinder, with a removed bight portion equal in thickness to the thickness of the wedge separator element 30, and present a clipped elliptical profile in the compressed configuration with a major axis along the separation faces substantially equal to the diameter 46 of the bearing sections and top threaded portions. A resulting minor axis 48 smaller than the diameter 46 allows exposure of the compression surface 22 on each half section. Lugs 28 extend beyond diameter 46 to act as insertion stops against mating surface 50 of structural member 34 surrounding attachment holes 38 and are received in reliefs 42 but captured by the diameter 52 of the mounting apertures 40 in monument 36 upon rotation.

Figure 3B:
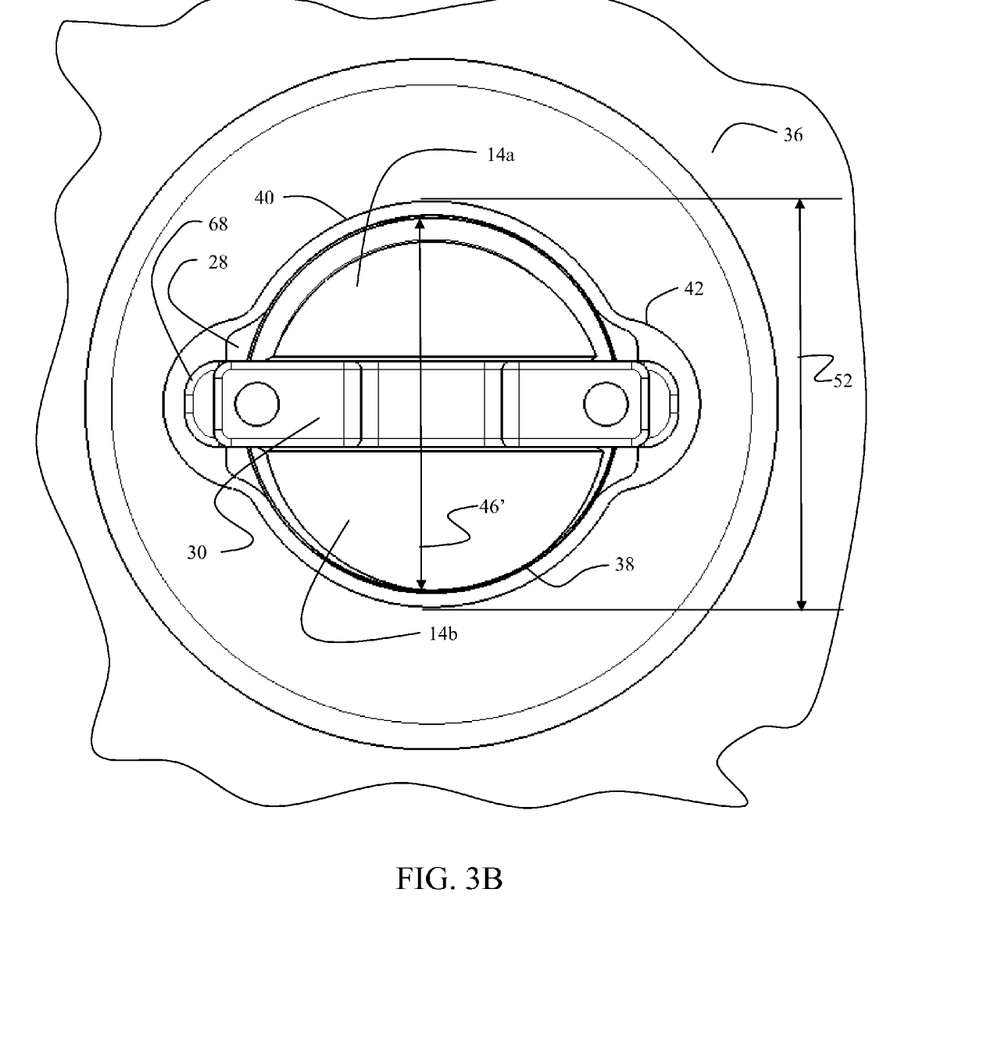
FIG. 3B is a top view of the split bolt elements with separator wedge inserted for hole engagement and showing details of the anti-rotation features (nut not shown for clarity)

As shown in FIG. 3B, insertion of wedge separator element 30 between half sections 14a and 14b of the split bolt element expands the split bolt element resulting in a substantially circular plan form of the bearing section 24 and top threaded portion 26 (both best seen in FIG. 1) having a diameter 46' substantially equal to the diameter of the attachment hole 38. This allows the thread free bearing section to engage the attachment hole in close contact for maximum structural integrity. FIGS. 3B, 3C, 4A and 4B as discussed herein omit the nut 32 for clarity in showing the wedge separator function. The nut and wedge separator element for the embodiments described are typically interconnected as a unit for assembly.

Figure 3C:
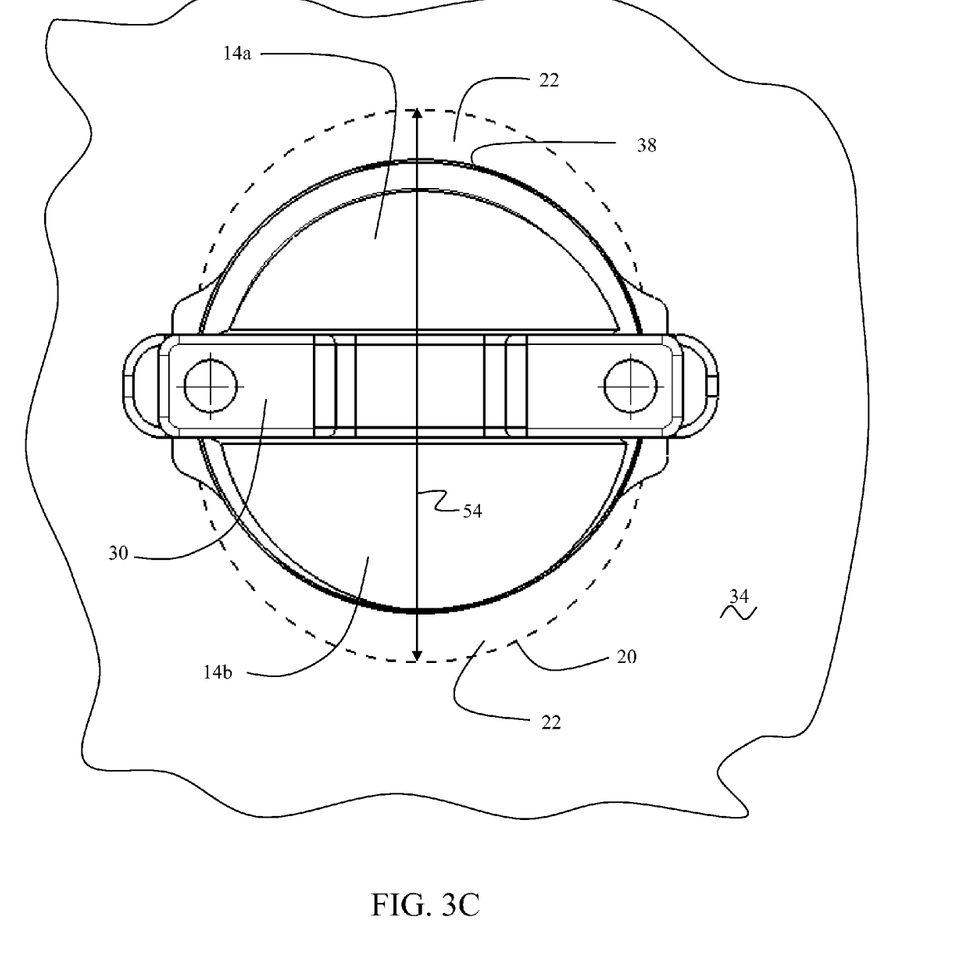
FIG. 3C is a top view of the split bolt elements with separator wedge inserted demonstrating the symmetric pull-off and compression surface (nut not shown for clarity)

As shown in FIG. 3C, with monument 36 removed for clarity, expansion of split bolt element half sections 14a, 14b with wedge separator element 30 results in a substantially elliptical plan form having a major axis 54 for capture portions 20 with associated compression faces 22 which engage a bottom surface 56 (seen in FIG. 2) surrounding mounting holes 38 in the structural member 34. While shown in the drawings as solid elements, the capture portions and associated compression faces may be segmented with an outer periphery consistent with the substantially circular collapsed plan form for insertion and the substantially elliptical expanded plan form for engagement.

Figure 4A:
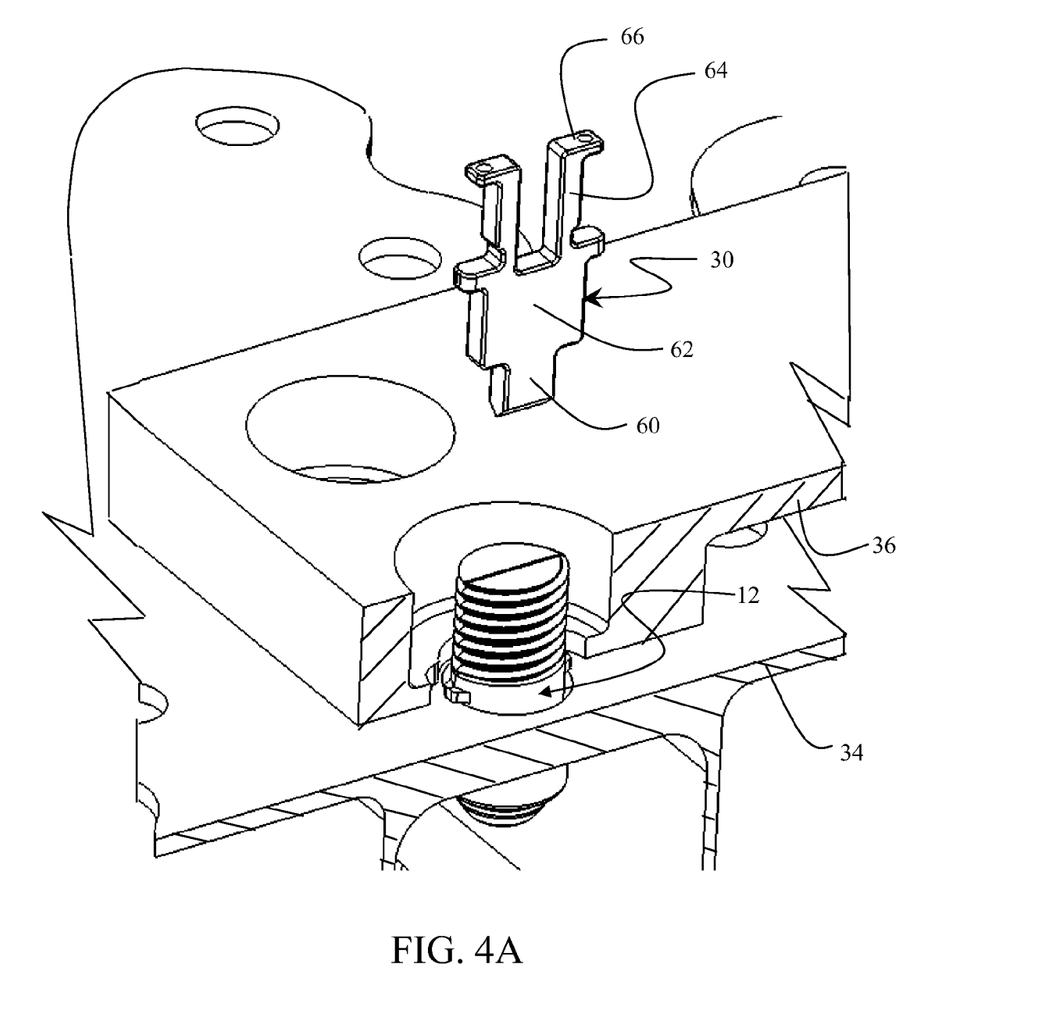
FIGS. 4A and 4B are isometric view showing details of the separator wedge prior to and after installation with the nut removed for clarity.
Figure 4B:
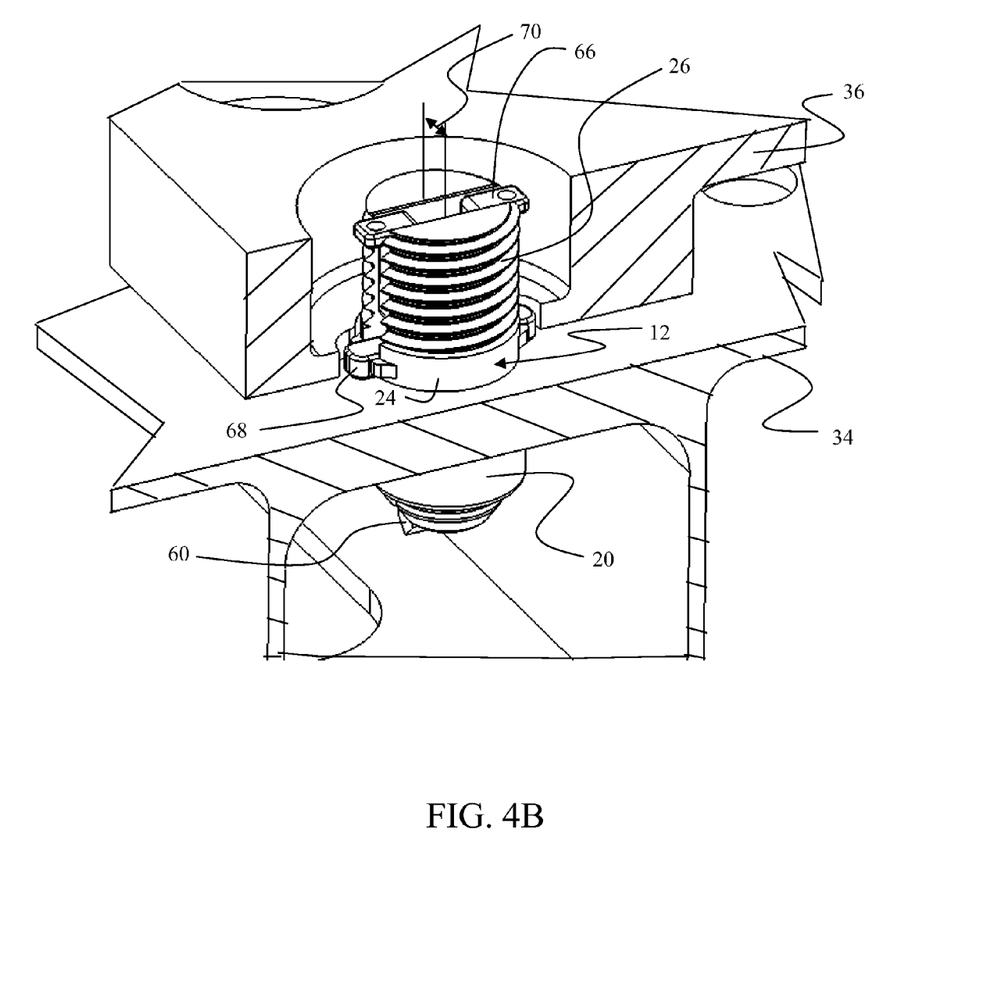

Wedge separator element 30, as best seen in FIG. 4A, incorporates a nose portion 60, which may be chamfered to assist in insertion between the split bolt element half sections, and a body portion 62 sized to be received within the bearing sections 24. For the embodiment shown, risers 64 extend from the body portion and terminate in tangs 66. Ears 68 extend laterally from the body portion substantially perpendicular to the risers and provide a dual function of cooperating with tangs 66 for retaining nut 32 (as seen in FIG. 1) and aligning between lugs 28 on opposing half sections 14a, 14b to assist in anti-rotation of the blind fastener system. For an exemplary embodiment, risers 64 are resilient to allow compression of tangs 66 for insertion into the threaded bore of the nut which is then constrained on a top surface by the tangs and a bottom surface by the ears. In exemplary embodiments, the wedge separator element 30 including the risers 64 and tangs 66 may be steel (such as 1505 CRES) or titanium. Alternative materials may be provided which incorporate sufficient structural strength and hardness for separation of the split bolt elements but with the required resilience for the risers and tangs. Thickness 70 of the wedge separator element is sufficient to expand the split bolt element into the substantially circular plan form for the bearing section 24 and top threaded portions 26 and the elliptical plan form for the capture portions 20 with associated compression surfaces 22 as previously described with respect to FIGS. 3B and 3C and shown in FIG. 4B. With insertion of the wedge separator element, split bolt element 12 is captured in attachment hole 38 with the lugs 28 engaging the top surface 50 of the structural member and the compression surfaces 22 of the capture portion engaging the bottom surface 56 as shown and described with respect to FIGS. 5A and 5B.

Figure 5A:
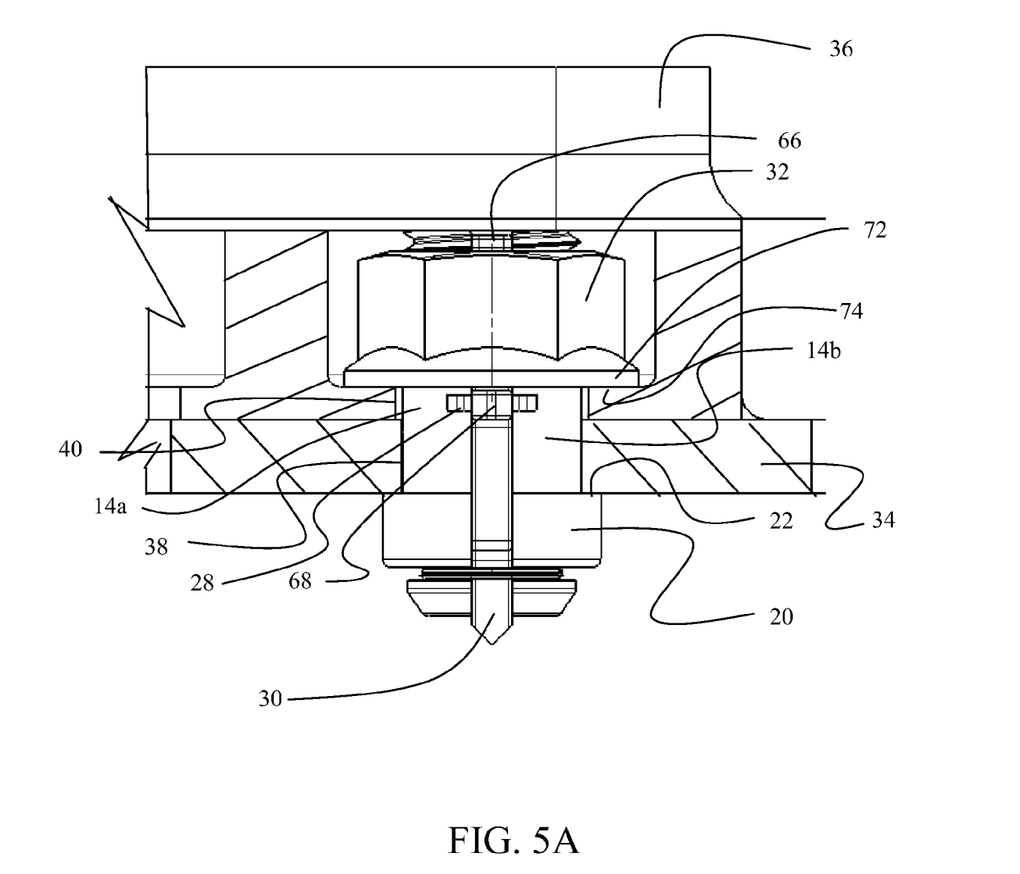
FIGS. 5A and 5B are side and end partial section views of the installed blind attach fastener system of the exemplary embodiment.
Figure 5B:
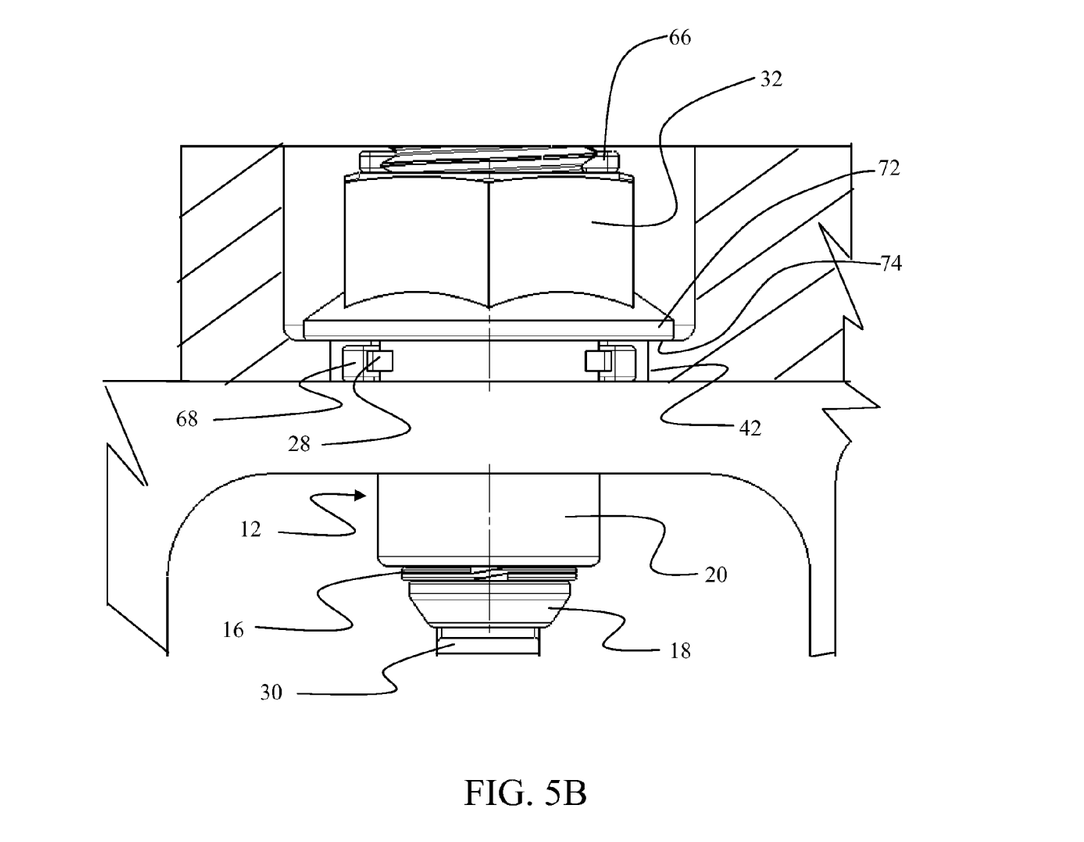

For the blind fastener system fully installed as shown in FIGS. 5A and 5B, compression surfaces 22 of the capture portion 20 engage the bottom surface 56 of the structural member 34 surrounding attachment hole 38. Bearing section 24 is closely received within the attachment hole. An engagement flange 72 on nut 32 is secured against a lip 74 surrounding mounting aperture 40. Thickness of the lip allows lugs 28 on the split bolt element and ears 68 on the wedge separator element to be received within reliefs 42 in the mounting aperture without interfering with the securing compression of the blind fastener system between flange 72 and compression surfaces 22.

Figure 6A:
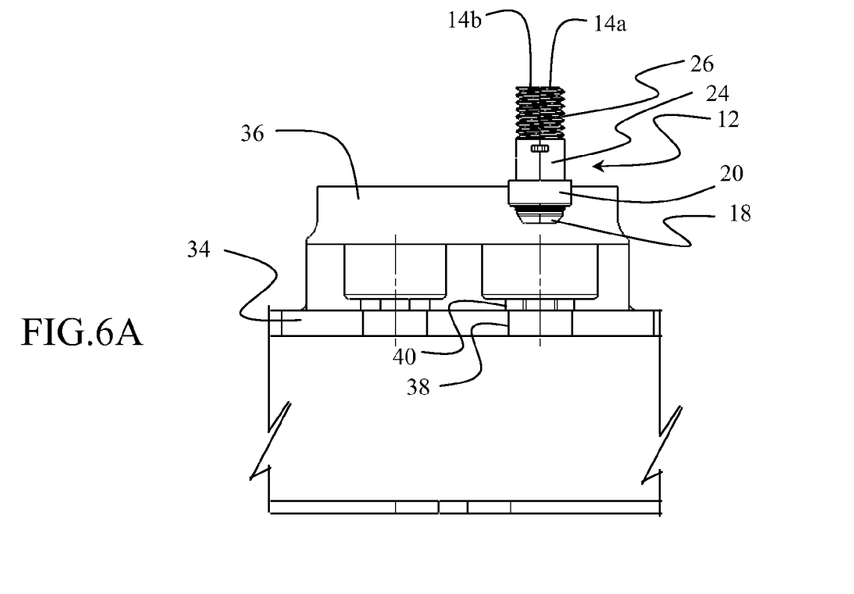
FIGS. 6A-6F are side partial section views demonstrating the installation sequence for the blind attach fastener system of the exemplary embodiment; and, FIG. 7 is an exemplary method for blind fastener installation.
Figure 6B:
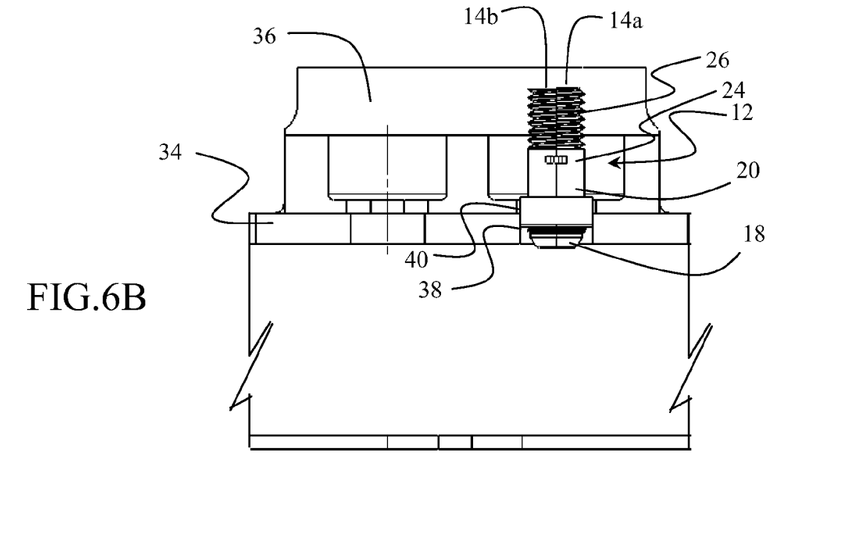
Figure 6C:
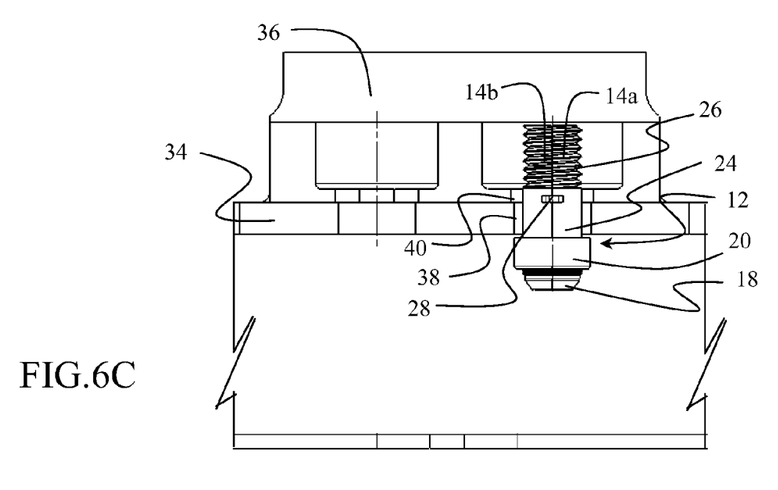
Figure 6D:
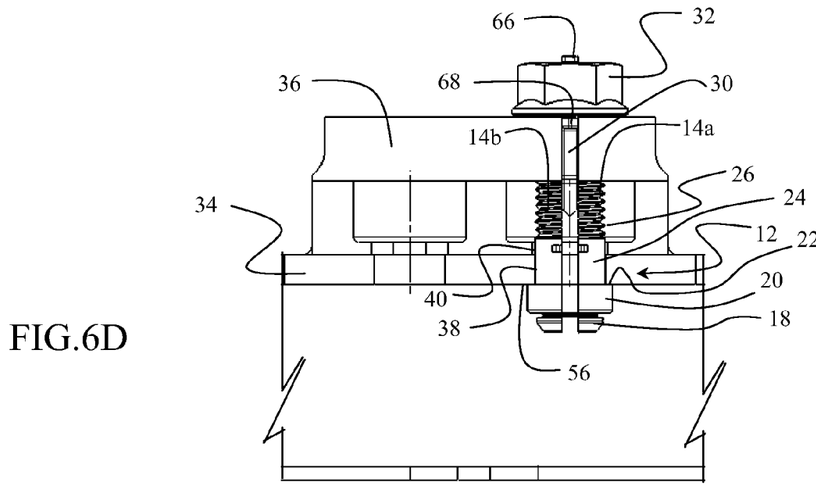
Figure 6E:
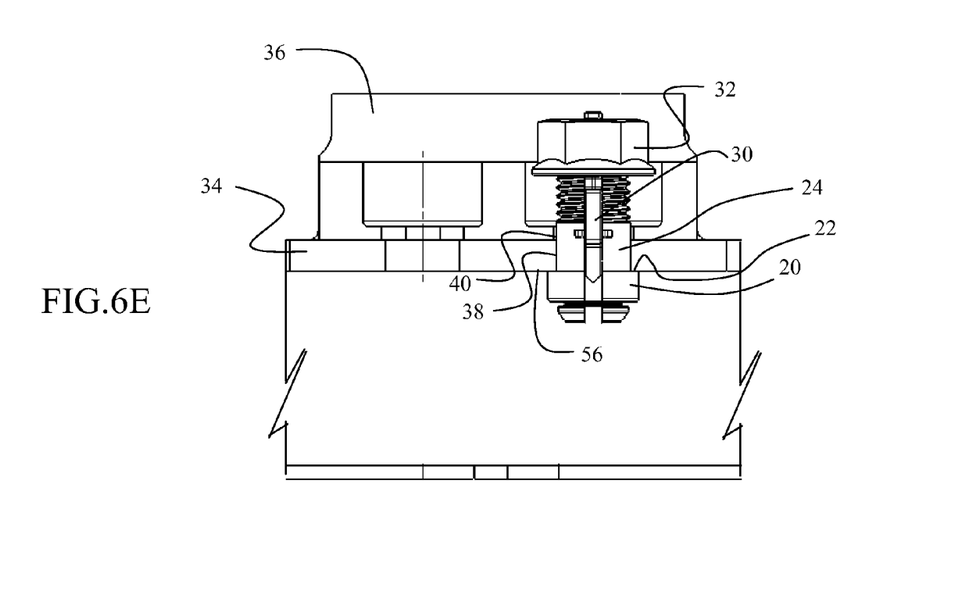
Figure 6F:
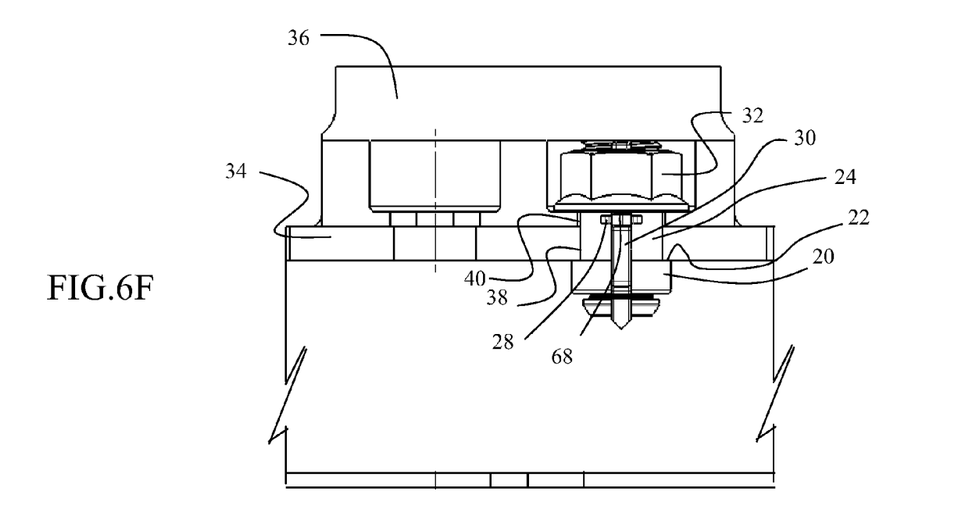

The installation sequence for the blind fastener system 10 is shown in FIGS. 6A-6F. Commencing with FIG. 6A, monument 36 is placed on the structural member 34 with the array of attachment holes 38 aligned with the corresponding array of mounting apertures 40. Split bolt element 12, with opposing half sections 14a, 14b constrained by snap ring 16, is compressed to the configuration with capture portion 20 in a substantial circular plan form. As shown in FIG. 6B, split bolt element 12 is then inserted by guiding tapered nose insertion portion 18 and capture portion 20 through a mounting aperture 40 and attachment hole 38 until lugs 28 engage top surface 50 surrounding the attachment hole as shown in FIG. 6C. In that position, bearing section 24 is placed adjacent the walls of attachment hole 38. Wedge separator element 30 with nut 32 engaged between tangs 66 and ears 68 is then inserted between separating faces 44 of opposing half sections 14a and 14b as shown in FIG. 6D urging the half sections into the configuration having a substantially circular plan form in bearing section 24 and threaded upper portion 26 and the extended elliptical plan form of capture portion 20 extending compression surfaces 22 under bottom surface 56 of the structural element adjacent the attachment hole. This places bearing section 24 in closely received engagement with the attachment hole and threaded upper portions 26 in position to threadably receive nut 32. Nut 32 is then threaded onto threaded upper portions 26 of the split bolt element. Ears 68 engaged by flange 72 of the nut drives wedge separator element 30 through the half sections as shown in FIG. 6E creating firm engagement between the bearing section and attachment hole. Rotation of the split bolt element is prevented by lugs 28 at the extent of recesses 42 (as seen in FIG. 3B) in the mounting aperture. Complete tightening of nut 32 brings flange 72 into contact with lip 74 of the mounting aperture and aligns ears 68 between lugs 28 for additional anti-rotation capability while drawing compression surfaces 22 into firm engagement with the structural member bottom surface and tensioning the split bolt elements to securely fasten the monument 36 to the structural member as shown in FIG. 6F. As seen in the figure, in the torqued position, proper engagement of the blind fastener can be determined by visual inspection of the end of the split bolt element and one or more threads extending from the nut 32.

Figure 7A:
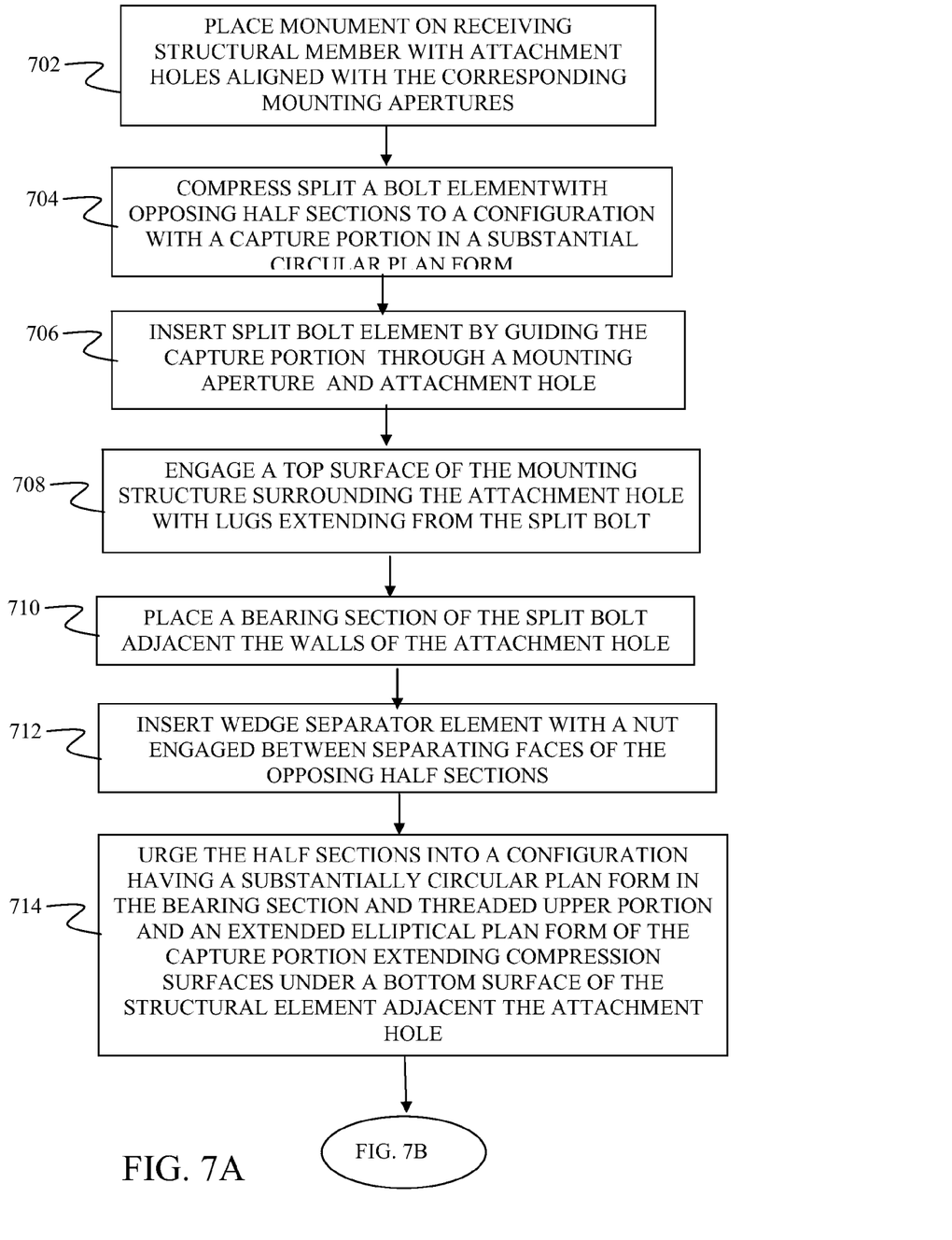
Figure 7B:
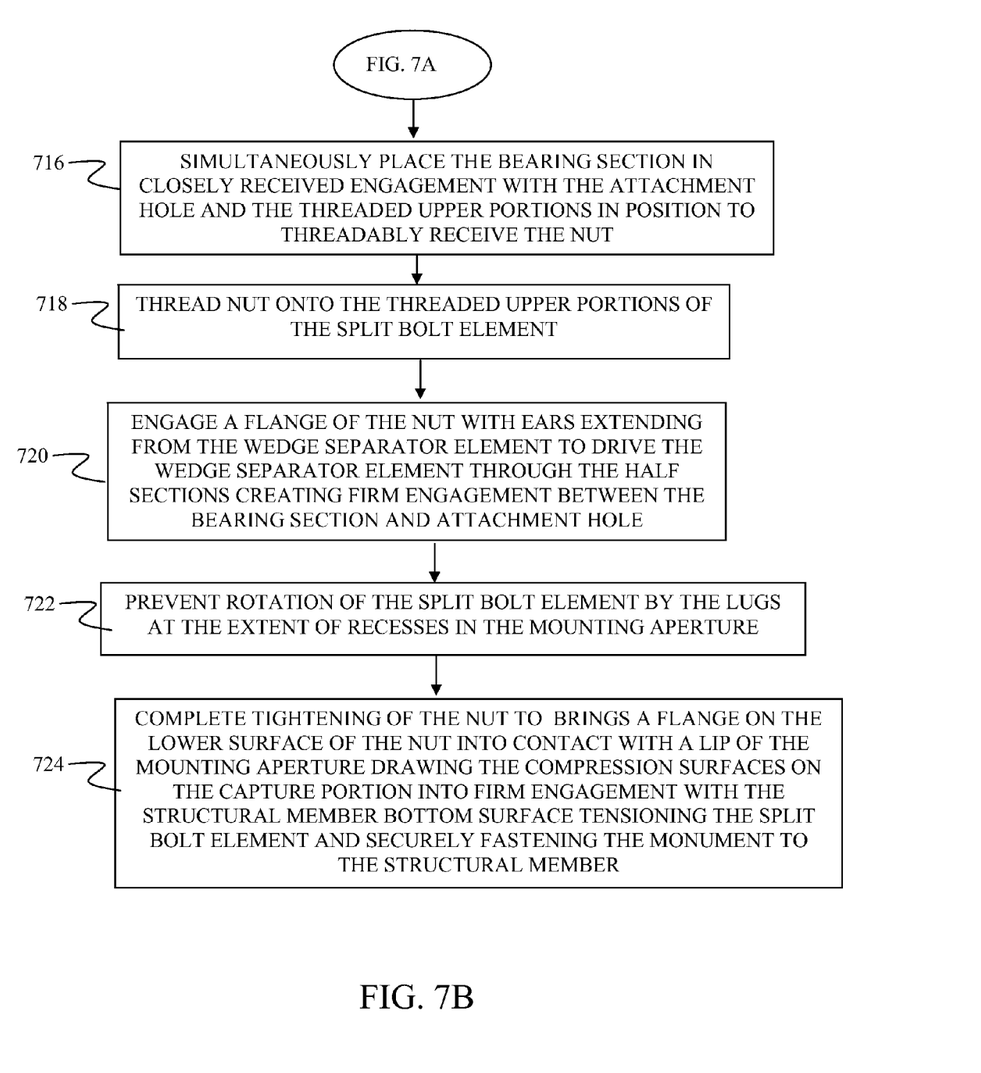

The method provided by the installation sequence is shown in FIG. 7 wherein the monument to be attached is placed on a receiving structural member with attachment holes aligned with the corresponding mounting apertures, step 702. A split bolt element, with opposing half sections, is compressed to a configuration with a capture portion in a substantial circular plan form, step 704. The split bolt element is then inserted by guiding the capture portion through a mounting aperture and attachment hole, step 706, until lugs extending from the split bolt engage a top surface of the mounting structure surrounding the attachment hole, step 708, simultaneously placing a bearing section adjacent the walls of the attachment hole, step 710. A wedge separator element with a nut engaged is then inserted between separating faces of the opposing half sections, step 712 and the half sections are urged into a configuration having a substantially circular plan form in the bearing section and threaded upper portion and an extended elliptical plan form of the capture portion extending compression surfaces of the capture portion under a bottom surface of the structural element adjacent the attachment hole, step 714. This simultaneously places the bearing section in closely received engagement with the attachment hole and the threaded upper portions in position to threadably receive the nut, step 716. The nut is then threaded onto the threaded upper portions of the split bolt element, step 718. Ears extending from the wedge separator element engage a flange of the nut which drives the wedge separator element through the half sections creating firm engagement between the bearing section and attachment hole, step 720. Rotation of the split bolt element is prevented by the lugs at the extent of recesses in the mounting aperture, step 722. Complete tightening of the nut brings a flange on the lower surface of the nut into contact with a lip of the mounting aperture drawing the compression surfaces on the capture portion into firm engagement with the structural member bottom surface tensioning the split bolt element and securely fastening the monument to the structural member, step 724.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A blind fastener comprising:
    a split bolt element having two symmetrical half sections split at mating separation faces and cooperatively displaceable between a first collapsed position and a second expanded position, said half sections incorporating a nose portion with a circumferential groove receiving a snap ring;
    a capture portion adjacent the nose portion having a substantially circular plan form in the first collapsed position with a diameter to be received through an attachment hole in a structural member;
    a bearing section and a threaded portion both having a substantially circular plan form in the second expanded position, said capture portion having compression surfaces extending with an elliptical major axis greater than said diameter in the extended second position to engage a bottom surface surrounding said attachment hole and said bearing section closely engaged by the attachment hole;
    a wedge separator element insertable between said half sections to expand said half sections from the first collapsed position to the second expanded position;
    a nut threadably received by said threaded portion and engaging a lip on a mounting aperture in a monument to be attached to the supporting structure, said mounting aperture concentric with said attachment hole.

2. The blind fastener as defined in claim 1 further comprising lugs extending diametrically intermediate the bearing section and threaded portion for engagement of an upper surface surrounding said attachment hole.

3. The blind fastener as defined in claim 2 wherein the lugs are received in a relief in the mounting aperture for engagement of extents of the relief to prevent rotation of the split bolt element.

4. The blind fastener as defined in claim 1 wherein the wedge separator element includes a nose portion chamfered to facilitate insertion between said half sections and a body portion engaged intermediate said bearing section and said capture portion of the half sections in a fully inserted position.

5. The blind fastener as defined in claim 4 wherein the wedge separator element further comprises opposed risers extending from the body portion and terminating in tangs, said risers resilient for compression to be received in a threaded bore of the nut and expansion to capture the nut with the tangs.

6. The blind fastener as defined in claim 5 wherein the wedge separator element further includes ears extending from the body portion to engage a bottom flange of the nut and cooperatively constrain the nut with the tangs and to urge the wedge separator element between the half sections during threading of the nut on the threaded portion.

7. The blind fastener as defined in claim 6 wherein the ears are received between the lugs with the nut fully threaded on the threaded portion, said ears received in said reliefs.

8. A blind fastener comprising:
a split bolt element having two symmetrical half sections split at mating separation faces and cooperatively displaceable between a first collapsed position and a second expanded position, said half sections incorporating a nose portion with a circumferential groove receiving a snap ring;
a capture portion adjacent the nose portion having a substantially circular plan form in the first collapsed position with a diameter to be received through an attachment hole in a structural member;
a bearing section and a threaded portion both having a substantially circular plan form in the second expanded position, said capture portion having compression surfaces extending with an elliptical major axis greater than said diameter in the extended second position to engage a bottom surface surrounding said attachment hole and said bearing section closely engaged by the attachment hole;
lugs extending diametrically intermediate the bearing section and threaded portion for engagement of an upper surface surrounding said attachment hole, said lugs received in a relief in the mounting aperture for engagement of extents of the relief to prevent rotation of the split bolt element;
a wedge separator element insertable between said half sections to expand said half sections from the first collapsed position to the second expanded position, said wedge separator element including a nose portion chamfered to facilitate insertion between said half sections and a body portion engaged intermediate said bearing section and said capture portion of the half sections in a fully inserted position and opposed risers extending from the body portion and terminating in tangs;
a nut having a threaded bore receiving said risers, said risers resilient for compression to be received in the threaded bore of the nut and expansion to capture the nut with the tangs, said nut engaging ears extending from the body portion of the wedge separator element with a bottom flange, said ears cooperatively constraining the nut with the tangs and said ears urging the wedge separator element between the half sections during threading of the nut on the threaded portion, said flange further engaging a lip on a mounting aperture in a monument to be attached to the supporting structure, said mounting aperture concentric with said attachment hole, said ears received between the lugs and received in said reliefs with the nut fully threaded on the threaded portion.

9. A track attach fastener system, comprising:
a bolt assembly split into two halves along its longitudinal centerline, having
a barrel shaped bolt having a first and a second end;
a threaded section along a segment of the first end;
a shoulder section along a segment of the second end;
a plurality of anti-rotation lugs located between said first and second ends; and
a circumferential groove located along said second end;
a snap ring configured to fit into said circumferential groove to secure said two bolt assembly halves;
a wedge separator element extending along at least the full length of said bolt assembly and configured to fit between said two bolt assembly halves;
a threaded nut configured to engage said threaded segment of said barrel shaped bolt;
wherein said track attach fastener fits into a track to secure seats or monuments to a floor system.

10. The track attach fastener system as defined in claim 9 wherein the wedge separator element includes a nose portion chamfered to facilitate insertion between said two halves and a body portion engaged intermediate said shoulder section in a fully inserted position.

11. The blind fastener as defined in claim 10 wherein the wedge separator element further comprises opposed risers extending from the body portion and terminating in tangs, said risers resilient for compression to be received in a threaded bore of the nut and expansion to capture the nut with the tangs.

12. The blind fastener as defined in claim 11 wherein the wedge separator element further includes ears extending from the body portion to engage a bottom flange of the nut and cooperatively constrain the nut with the tangs and to urge the wedge separator element between the two halves during threading of the nut on the threaded portion.

13. The blind fastener as defined in claim 12 wherein the ears are received between the lugs with the nut fully threaded on the threaded portion.

14. A method for blind fastening comprising:
placing a monument to be attached on a receiving structural member with attachment holes aligned with corresponding mounting apertures;
compressing a split bolt element, with opposing half sections, to a configuration with a capture portion in a substantial circular plan form;
inserting the split bolt element by guiding the capture portion through a mounting aperture and attachment hole;
placing a bearing section adjacent the walls of the attachment hole;
inserting a wedge separator element with a nut engaged between separating faces of the opposing half sections, urging the half sections into a configuration having a substantially circular plan form in the bearing section and threaded upper portion and an extended elliptical plan form of the capture portion extending compression surfaces of the capture portion under a bottom surface of the structural element adjacent the attachment hole;
simultaneously placing the bearing section in closely received engagement with the attachment hole and the threaded upper portions in position to threadably receive the nut;
threading the nut onto the threaded upper portions of the split bolt element;
engaging ears extending from the wedge separator element with a flange of the nut driving the wedge separator element through the half sections creating firm engagement between the bearing section and attachment hole;
tightening the nut to bring the flange on the lower surface of the nut into contact with a lip of the mounting aperture drawing the compression surfaces on the capture portion into firm engagement with the structural member bottom surface tensioning the split bolt element and securely fastening the monument to the structural member.

15. The method of claim 14 wherein the step of inserting further comprises:

engaging a top surface of the mounting structure surrounding the attachment hole with lugs extending from the split bolt.

16. The method of claim 15 further comprising:

preventing rotation of the split bolt element by engaging the lugs at the extent of recesses in the mounting aperture.

\* \* \* \* \*